(12) United States Patent
Habedank et al.

(10) Patent No.: US 7,464,577 B2
(45) Date of Patent: Dec. 16, 2008

(54) METHOD FOR FABRICATING ROTARY MACHINES

(75) Inventors: Mark Steven Habedank, Hamilton, OH (US); Daniel Edward Wines, Cincinnati, OH (US); Mark Wesley Johnson, West Chester, OH (US); Gregory Stephen Bechtel, Cincinnati, OH (US); Charles William Carrier, West Chester, OH (US)

(73) Assignee: General Electric Company, Schenectady, NY (US)

( * ) Notice: Subject to any disclaimer, the term of this patent is extended or adjusted under 35 U.S.C. 154(b) by 12 days.

(21) Appl. No.: 10/882,367

(22) Filed: Jul. 1, 2004

(65) Prior Publication Data

US 2006/0000089 A1 Jan. 5, 2006

(51) Int. Cl.
*B21D 41/02* (2006.01)
(52) U.S. Cl. .................. 72/393; 29/889.2; 29/894.362
(58) Field of Classification Search .......... 72/393, 72/402, 352, 335; 29/894.362, 889.2
See application file for complete search history.

(56) References Cited

U.S. PATENT DOCUMENTS

| 1,937,878 | A |   | 12/1933 | Endsley |
|---|---|---|---|---|
| 2,848,805 | A | * | 8/1958 | Brink ........................... 72/324 |
| 3,009,747 | A | * | 11/1961 | Pitzer ........................... 384/272 |
| 3,381,515 | A |   | 5/1968 | Orloff |
| 3,616,521 | A | * | 11/1971 | Boggio ........................... 29/446 |
| 3,828,422 | A | * | 8/1974 | Schmitt ........................ 29/525 |
| 3,892,121 | A | * | 7/1975 | Champoux et al. ............ 72/393 |
| 3,986,383 | A | * | 10/1976 | Petteys ....................... 72/393 |
| 4,008,598 | A | * | 2/1977 | Purcupile et al. .............. 72/237 |
| 4,074,560 | A |   | 2/1978 | Sisk |
| 4,164,807 | A | * | 8/1979 | King, Jr. ...................... 29/523 |
| 4,187,708 | A | * | 2/1980 | Champoux .................. 72/30.1 |
| 4,370,788 | A | * | 2/1983 | Baker ..................... 29/888.061 |
| 4,411,715 | A |   | 10/1983 | Brisken et al. |
| 4,557,033 | A | * | 12/1985 | Champoux .................. 29/525 |
| 4,606,214 | A |   | 8/1986 | Miyazaki |
| 5,213,475 | A |   | 5/1993 | Peterson et al. |
| 5,360,240 | A | * | 11/1994 | Mott ............................ 285/95 |
| 6,241,832 | B1 |   | 6/2001 | Miller |
| 6,508,145 | B1 | * | 1/2003 | Gabrys ..................... 74/572.11 |
| 2004/0179939 | A1 |   | 9/2004 | Bluhm et al. |

OTHER PUBLICATIONS

International Search Report; Place of Search—Munich; Dated Oct. 25, 2005; Reference 145834/10762; Application No. 05254011.9-2302 PCT/; 3 Pgs.

* cited by examiner

*Primary Examiner*—Daniel C Crane
(74) *Attorney, Agent, or Firm*—William Scott Andes; Armstrong Teasdale LLP (57) ABSTRACT

A method and apparatus for fabricating a workpiece is provided. The method includes applying a predetermined axial force to a tool, translating the axial force into a radial force in the workpiece using the tool, and generating a hoop stress in the work piece sufficient to relieve residual stress in the workpiece.

12 Claims, 8 Drawing Sheets

METHOD FOR FABRICATING ROTARY MACHINES

BACKGROUND OF THE INVENTION

This invention relates generally to gas turbine engines and, more particularly, to assembling rotating components of gas turbine engines.

At least some known gas turbine engines include a core engine having, in serial flow arrangement, a fan assembly and a high pressure compressor which compresses airflow entering the engine. A combustor ignites a fuel-air mixture which is then channeled through a turbine nozzle assembly towards low and high pressure turbines which each include a disk having a plurality of rotor blades that extract rotational energy from gas flow exiting the combustor. Gas turbine engines are used in different operating environments, such as, to provide propulsion for aircraft and/or to produce power in both land-based and sea-borne power systems.

During normal operations gas turbine engines may operate with high rotational speeds and relatively high temperatures. Residual stresses from a metal alloy forging process used in fabricating the turbine disks may relieve during engine operation, such that the turbine disks may undesirably expand. Moreover, such disk expansion may adversely affect rotor-to-casing clearances during operation.

To facilitate reducing occurrences of disk expansion, at least some known engine disks are spun during the manufacturing process in a near-finished condition to relieve the residual stresses. Pre-spinning of the disks has generally the same effect on relieving the residual stress as actual engine operation. Final machining, such as, of mating features and/or rabbets, for example, is accomplished after the pre-spinning process. However, the pre-spinning process may be undesirable for several reasons, such as, for example, the costs, timing and logistics associated with removing the disk from the manufacturing cycle to perform the pre-spin process. Moreover, because the high rotational speeds are needed to relieve the residual stress, a balance condition of the disk and personnel safety issues may increase the complexity of the pre-spin process.

BRIEF DESCRIPTION OF THE INVENTION

In one aspect, a method and apparatus for fabricating a workpiece is provided. The method includes applying a predetermined axial force to a tool; translating the axial force into a radial force in the workpiece using the tool, and generating a hoop stress in the work piece sufficient to relieve residual stress in the workpiece.

In another aspect, a method of fabricating a gas turbine engine rotor disk is provided. The method includes forming a workpiece using a metal alloy forging process, reducing residual stress from the forging process using a tool to translate an axial force applied to the tool to a radial force in the workpiece, and final machining the workpiece.

In yet another aspect, a rotor disk for a gas turbine engine is provided. The rotor disk includes a hub portion, and a center bore extending through the hub portion wherein the hub portion has residual stresses from a forging fabrication process at least partially relieved using a hoop stress induced into the hub portion from the center bore.

DETAILED DESCRIPTION OF THE INVENTION

Figure 1:
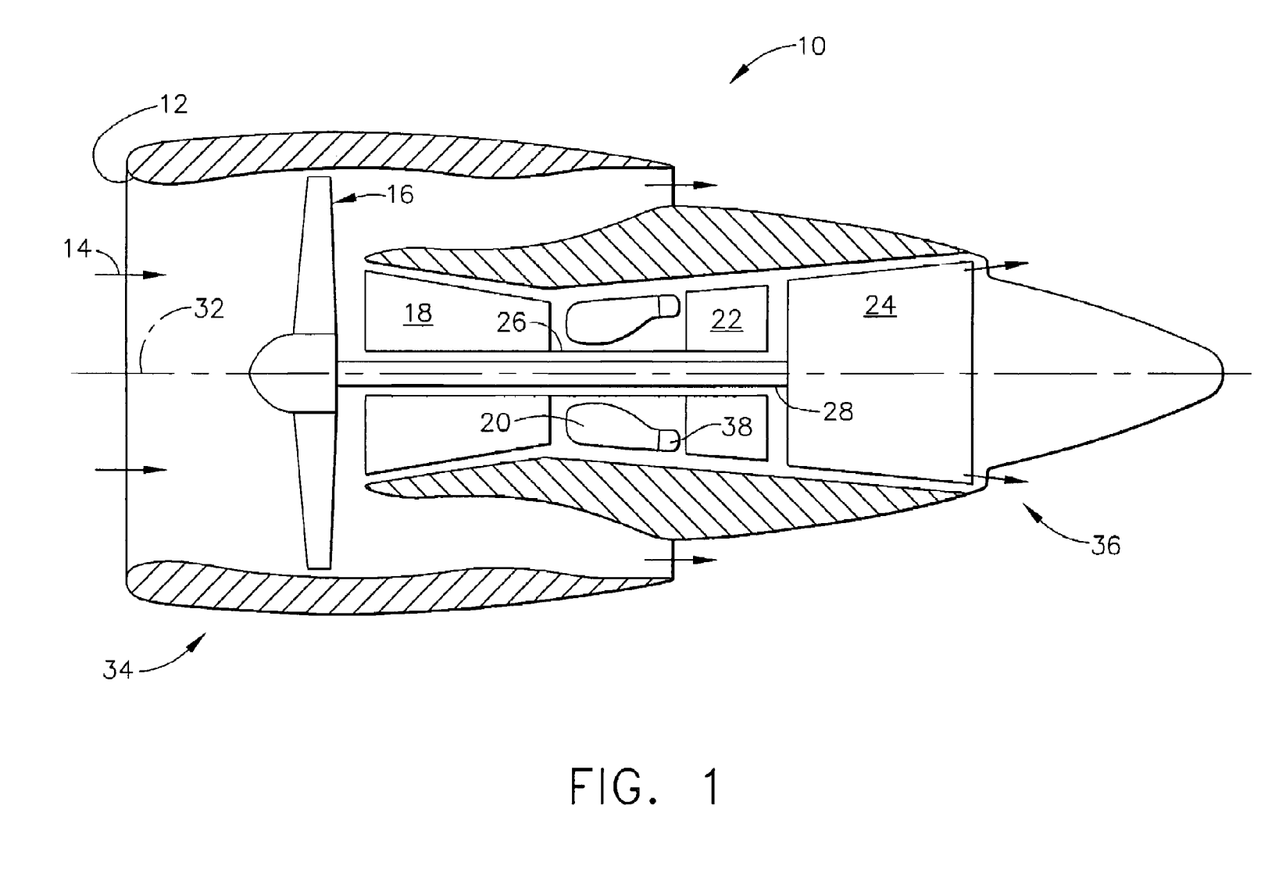
FIG. 1 is a schematic illustration of an exemplary gas turbine engine.

FIG. 1 is a schematic illustration of an exemplary high bypass, turbofan gas turbine engine 10 having in serial flow communication an inlet 12 for receiving ambient air 14, a fan 16, a compressor 18, a combustor 20, a high pressure turbine 22, and a low pressure turbine 24. The high pressure turbine 22 is joined to the compressor 18 by a high pressure shaft 26, and the low pressure turbine 24 is connected to the fan 16 by a low pressure shaft, or drive shaft 28. Engine 10 has an axis of symmetry 32 extending from an upstream side 34 of engine 10 aft to a downstream side 36 of engine 10. In one embodiment, gas turbine engine 10 is a GE90 engine commercially available from General Electric Company, Cincinnati, Ohio.

In operation, air flows through fan 16 and compressed air is supplied to high-pressure compressor 18. Highly compressed air is delivered to combustor 20. Combustion gases 38 from combustor 20 propel turbines 22 and 24. High pressure turbine 22 rotates second shaft 26 and high pressure compressor 18, while low pressure turbine 24 rotates first shaft 28 and fan 16 about axis 32.

Figure 2:
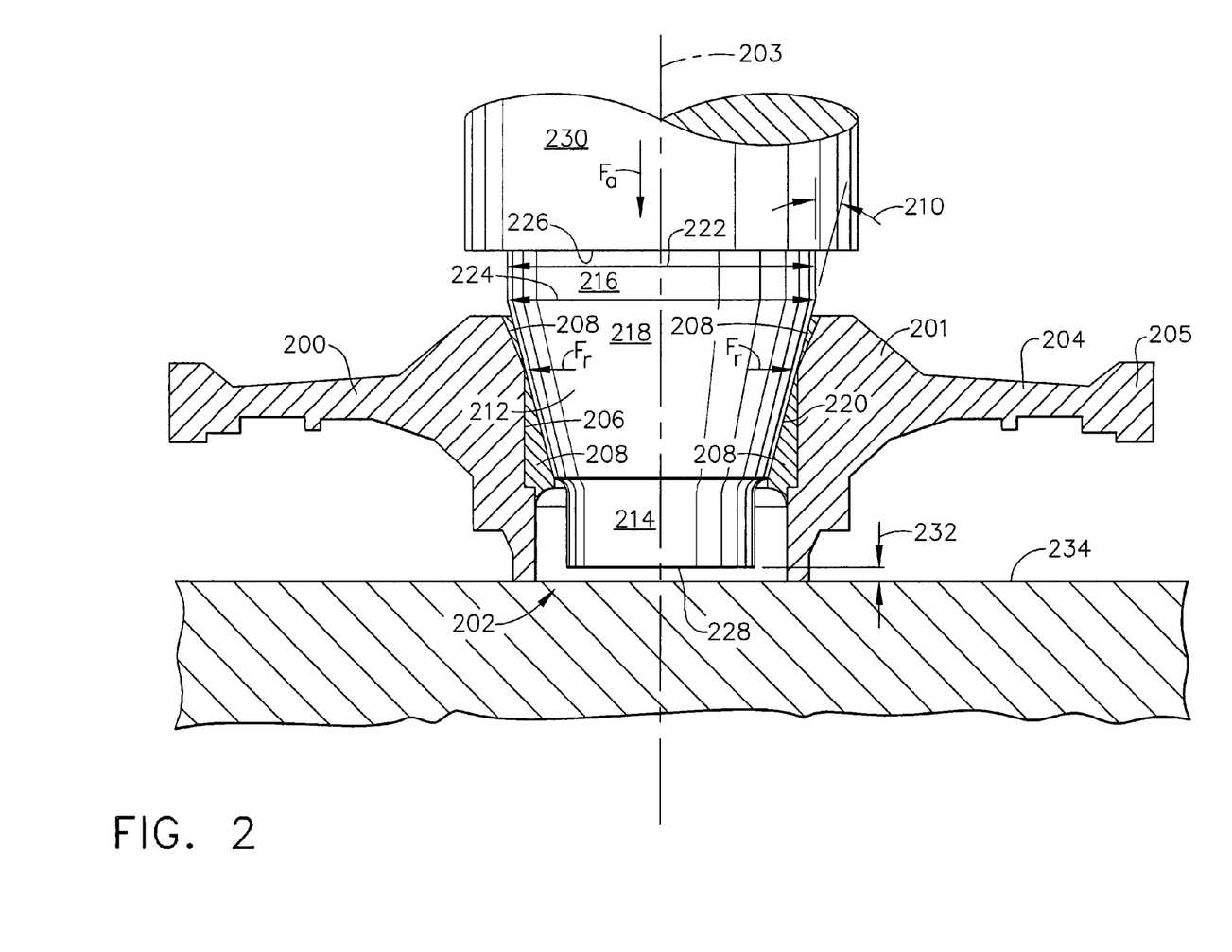
FIG. 2 is a side elevation view of an exemplary stress relief tooling configuration that may be used with a disk of the high pressure turbine shown in FIG. 1.

FIG. 2 is a side elevation view of an exemplary stress relief tooling configuration that may be used with a disk 200 of high pressure turbine 22 (shown in FIG. 1). In FIG. 2, high pressure turbine disk 200 is illustrated in a forging heat treat shape, prior to final machining. High pressure turbine disk 200 includes a hub portion 201 having a center bore 202 therethrough and a longitudinal axis 203 about which disk 200 rotates during operation. A web portion 204 extends radially outward from hub portion 201 and a rim portion 205 extends radially outward from web portion 204. Center bore 202 includes an inner circumferential surface 206, at least a portion of which includes excess stock 208 that may be removed during a subsequent machining process. An amount and location of excess stock 208 may define a radially convergent cross section through bore 202. In the exemplary embodiment, an angle of convergence 210 is approximately fifteen degrees. In other embodiments, angle of convergence may be of other angular magnitudes. A plug tool 212 includes a lower cylindrical portion 214, an upper cylindrical portion 216, and a frusto-conical portion 218 extending therebetween. Frusto-conical portion 218 includes an outer surface 220 with a frusto-conical cross-section that substantially mates to disk inner circumferential surface 206. In the exemplary embodiment, plug tool 212 is unitary. In an alternative embodiment, plug tool 212 is formed of a plurality of wedge sections extending circumferentially about inner circumferential surface 206. In another alternative embodiment, plug tool 212 is fabricated from a plurality of stackable tooling disks, each with an outside diameter that mates to inner circumferential surface 206. Upper cylindrical portion 216 includes an engagement face 226 that is substantially perpendicular to longitudinal axis 203 and lower cylindrical portion 214 includes an travel stop face 228 that is substantially parallel to engagement face 226. Although the stress relief tooling configuration is described in relation to a high pressure turbine disk of a gas turbine engine, it should be understood the process may be used on any similarly configured workpiece and is not limited to the specific embodiment described herein.

During fabrication, high pressure turbine disk 200 may be formed in a powder metal alloy forging process wherein high pressure turbine disk 200 is not machined to final tolerances, but rather is forged to blank dimensions. Final dimensions may be machined in subsequent processes wherein mating surfaces, attachments points, and slots are formed. During the forging process residual stresses remain in high pressure turbine disk 200. To relieve such stresses, a hoop stress is induced into high pressure turbine disk 200 through bore 202 of a predetermined magnitude, which is sufficient to relieve the residual stresses. In the exemplary embodiment, an axial force $F_a$ is applied to engagement face 226 through a hydraulic ram 230 in a direction 231 that is parallel to longitudinal axis 203. Force $F_a$ causes outer surface 220 to slidily engage inner circumferential surface 206 and move the larger diameter portion of plug tool 212 into bore 202. Plug tool 212 bearing on inner circumferential surface 206 generates a radially outward force $F_r$ about the circumference of inner circumferential surface 206. An axial travel of plug tool 212 is limited to a distance 232 between travel stop face 228 and a working surface 234. After plug tool 212 has traveled through distance 232, contact between travel stop face 228 and working surface 234 substantially prevents further travel of plug tool 212. Limiting travel of plug tool 212 limits force $F_r$ applied to high pressure turbine disk 200 to an amount predetermined to relieve the residual stresses from the forging process. Although fabrication of high pressure turbine disk 200 is described relative to a powder metal alloy forging process, it should be understood that the powder metal alloy forging process is illustrative of an exemplary fabrication process that may be used to form high pressure turbine disk 200 and is not limiting to only this process.

Figure 3:
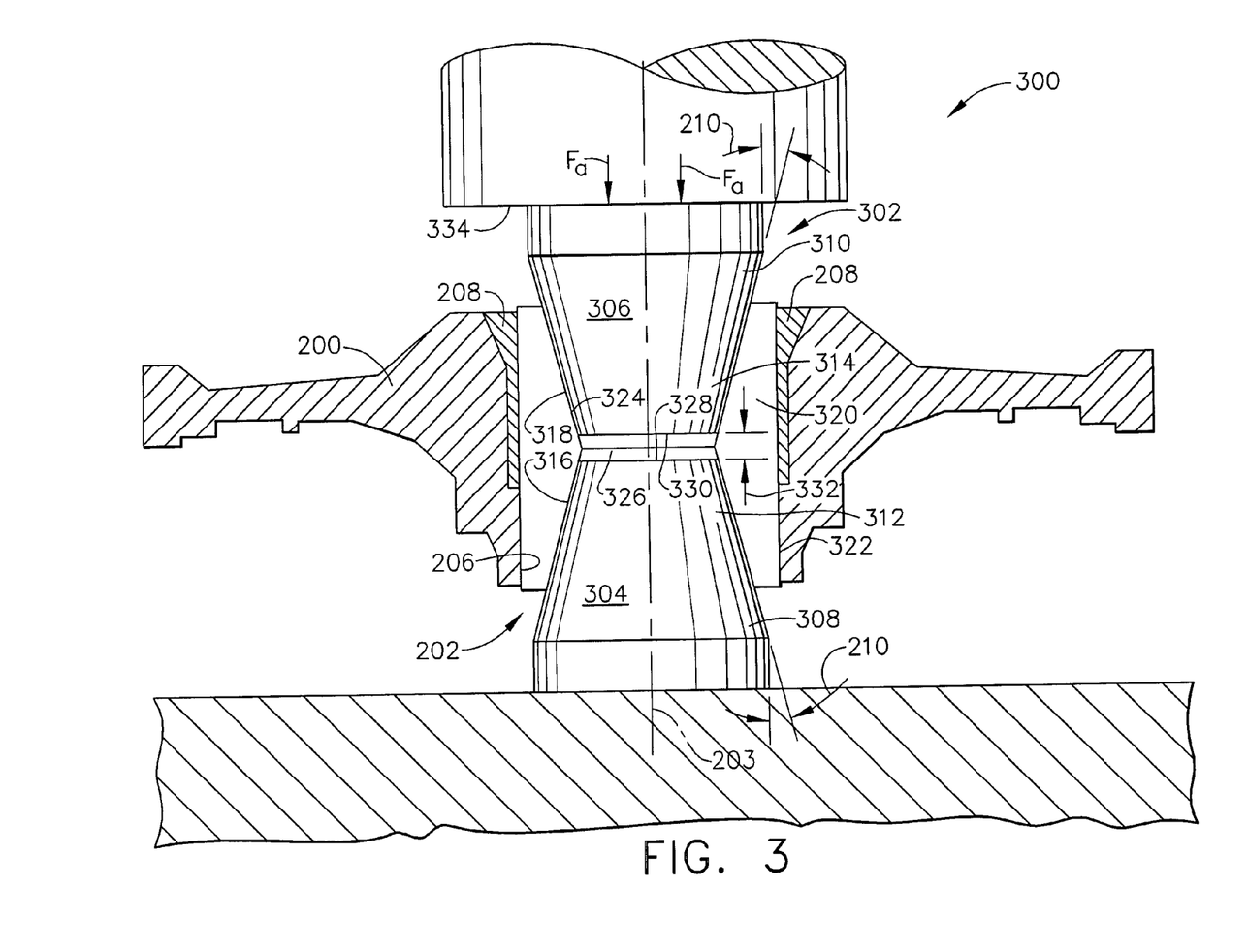
FIG. 3 is a side elevation view of an alternative stress relief tooling configuration that may be used with the disk of the high pressure turbine shown in FIG. 1.

FIG. 3 is a side elevation view of an alternative stress relief tooling configuration 300 that may be used with disk 200 of high pressure turbine 22 (shown in FIG. 1). In FIG. 3, high pressure turbine disk 200 is illustrated in a forging heat treat shape, prior to final machining. High pressure turbine disk 200 includes a center bore 202 and longitudinal axis 203 therethrough. Center bore 202 includes an inner circumferential surface 206, at least a portion of which includes excess stock 208 that may be removed during a subsequent machining process. An amount and location of excess stock 208 may define a cylindrical cross section through bore 202.

A plug tool 302 used in configuration 300 includes a first frusto-conical member 304 and a second frusto-conical member 306. Each frusto-conical member 304 and 306 includes a large diameter end 308 and 310 respectively, and a smaller diameter end 312 and 314, respectively. Each frusto-conical member 304 and 306 includes a taper sidewall 316 and 318, respectively. In the exemplary embodiment, angle of convergence 210 of each sidewall 316 and 318 is approximately fifteen degrees. In an alternative embodiment, angle 210 is another angular magnitude. In yet another embodiment, angle of convergence 210 of sidewall 316 is not equal to angle of convergence 210 of sidewall 318.

Configuration 300 includes a double taper mating ring 320 having an outer cylindrical surface 322 sized to mate with inner circumferential surface 206 of disk 200 and a radially inner double tapered surface 324 configured to mate to sidewalls 316 and 318. When fully assembled, a gap 326 is defined between a travel stop face 328 of smaller diameter end 312 and a travel stop face 330 of smaller diameter end 314. A width 332 of gap 326 defines a distance of travel of frusto-conical member 306 during a stress relief process described below in greater detail.

During fabrication, frusto-conical members 304 and 306 are aligned coaxially along longitudinal axis 203 in bore 202, such that frusto-conical members 304 and 306 are concentrically aligned with double taper mating ring 320 and high pressure turbine disk 200. An axial force $F_a$ may be applied to an upper surface 334 of frusto-conical member 306. Force $F_a$ drives frusto-conical member 306 along longitudinal axis 203 until travel stop face 330 mates with travel stop face 328. The axial movement of frusto-conical member 306 transmits a second axial force to double taper mating ring 320 causing it to slide along sidewall 316. The resulting compression due to the taper sidewalls and frusto-conical shape of members 306 and 304 generate a radial force $F_r$ about inner circumferential surface 206 of disk 200, such that hoop stresses are generated in disk 200 that are of sufficient magnitude to relieve the residual stresses in disk 200 from the forging process.

Figure 4:
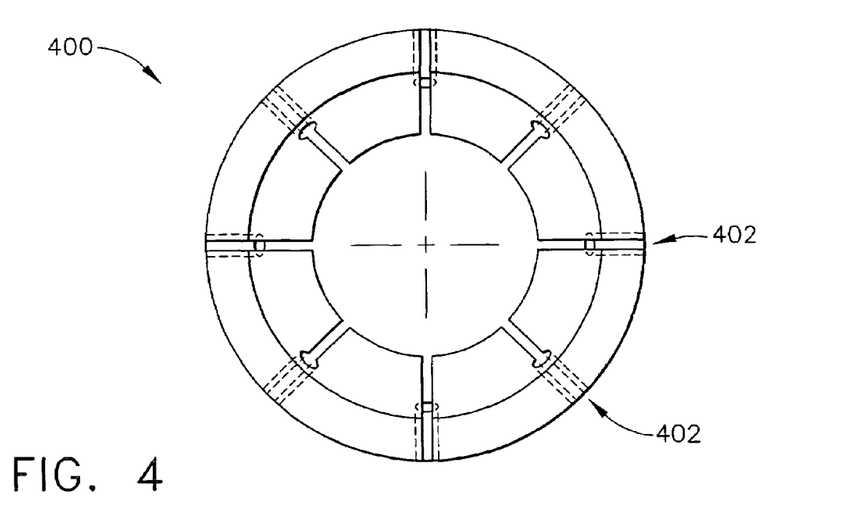
FIG. 4 is a plan view of an exemplary slotted ring that may be used with the plug tool shown in FIG. 2.
Figure 5:
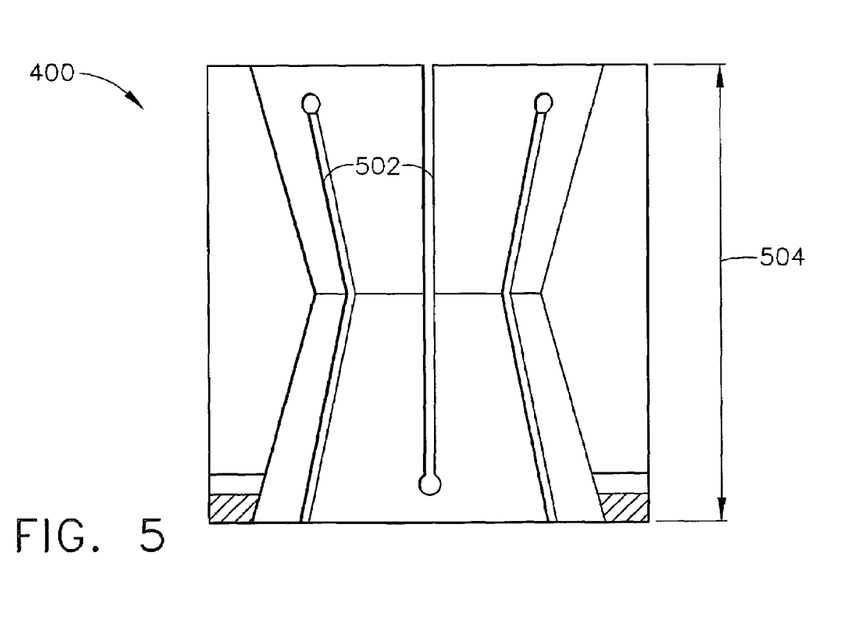
FIG. 5 is a elevation view of an exemplary slotted ring that may be used with the double tapered plugs shown in FIG. 3.

FIG. 4 is a plan view of an exemplary slotted ring 400 that may be used with plug tool 212 (shown in FIG. 2). FIG. 5 is a elevation view of a slotted ring 500 that may be used with the double tapered plugs 304 and 306 (shown in FIG. 3). Slotted rings 400 and 500 may include a plurality of lengthwise partial slots 402 and 502, respectively formed in an outer periphery of plug 212 and/or double tapered plugs 304 and 306. Slots 402 and/or 502 may be formed through at least a portion of an axial length of plug 212 and through at least a portion of an axial length 504 of double tapered plugs 304 and 306 to permit expansion of plug 212 and/or double tapered plugs 304 and 306 during the stress relief process.

Figure 6:
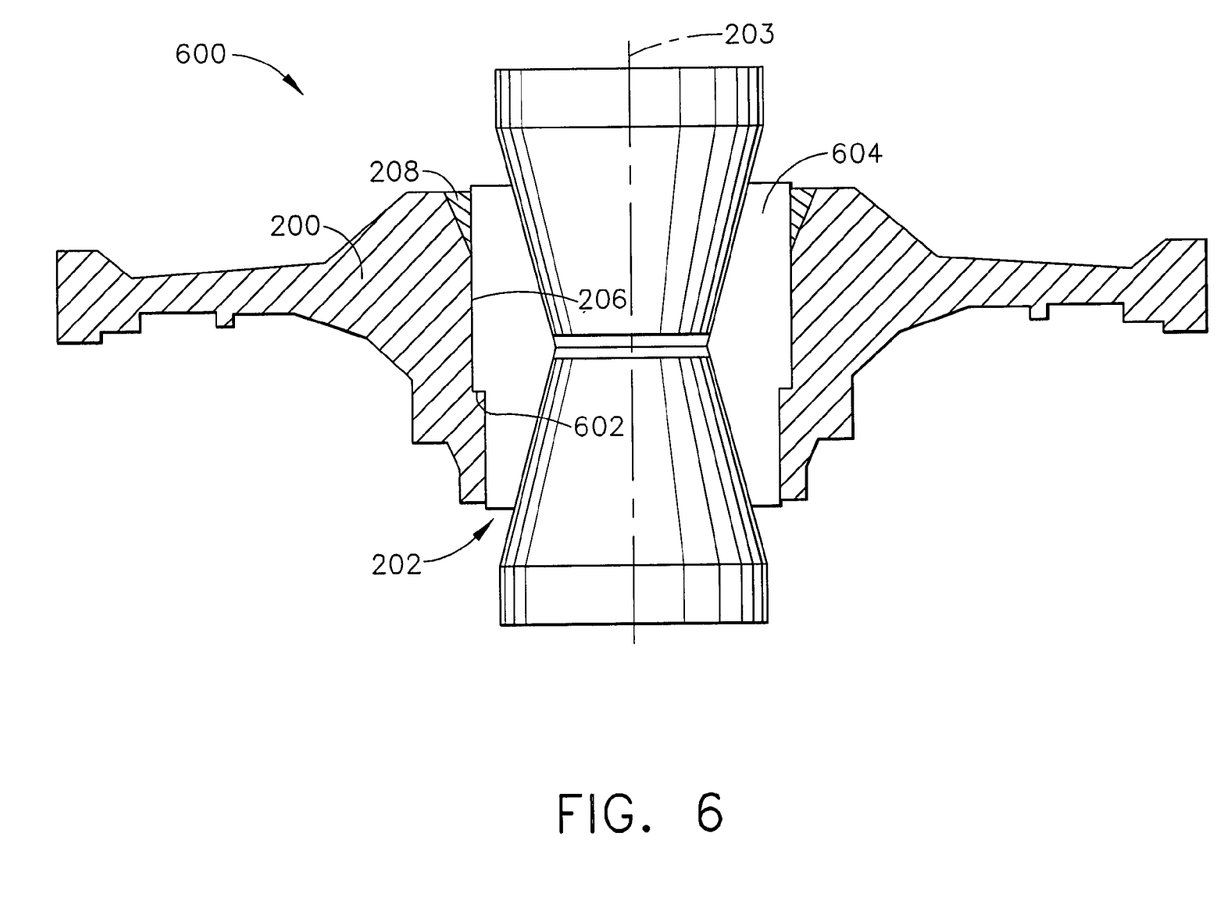
FIG. 6 is a side elevation view of another alternative stress relief tooling configuration that may be used with the disk of the high pressure turbine shown in FIG. 1.

FIG. 6 is a side elevation view of another alternative stress relief tooling configuration 600 that may be used with disk 200 of high pressure turbine 22 (shown in FIG. 1). In FIG. 6, high pressure turbine disk 200 is illustrated in a forging heat treat shape, prior to final machining. High pressure turbine disk 200 includes center bore 202 and longitudinal axis 203 therethrough. Center bore 202 includes an inner circumferential surface 206, at least a portion of which includes excess stock 208 that may be removed during a subsequent machining process. An amount and location of excess stock 208 may define a cylindrical cross section through bore 202. In the exemplary embodiment, inner circumferential surface 206 also includes at least one of radial discontinuity, such as a lip 602 that may preclude use of a single taper or double taper plug tool. Configuration 600 includes a slotted ring 604 having an outer surface 606 machined to mate to inner circumferential surface 206 including lip 602 and any other radial discontinuities or radial shapes that may be formed in inner circumferential surface 206. Slotted ring 604 may also be segmented, such that a plurality of circumferential segments are spaced circumferentially along inner circumferential surface 206. A plug tool 606 used in configuration 600 is substantially similar to plug tool 302 used in configuration 300 (shown in FIG. 3).

Figure 7:
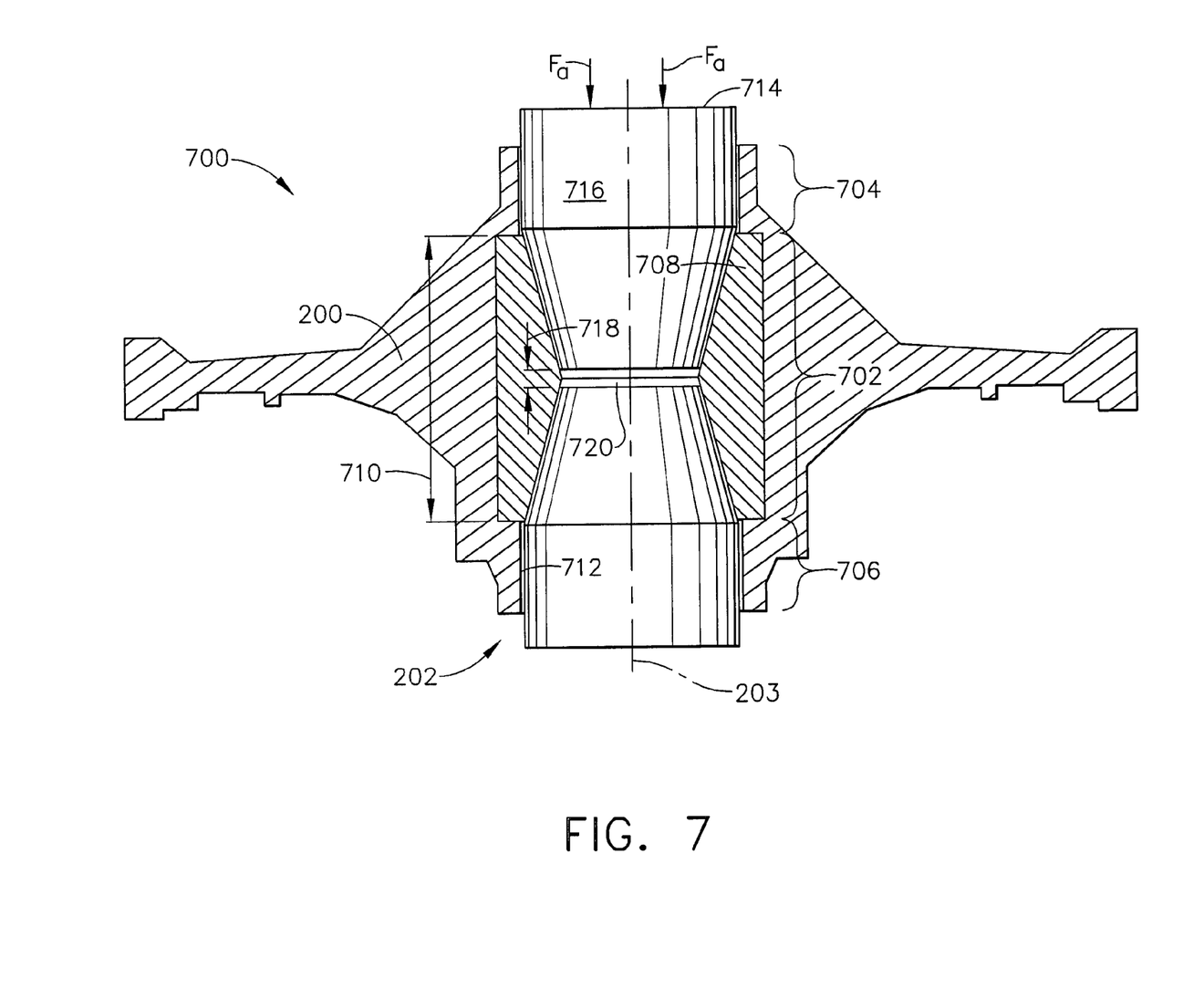
FIG. 7 is a side elevation view of another alternative stress relief tooling configuration that may be used with the disk of the high pressure turbine shown in FIG. 1.

FIG. 7 is a side elevation view of another alternative stress relief tooling configuration 700 that may be used with disk 200 of high pressure turbine 22 (shown in FIG. 1). Configuration 700 includes high pressure turbine disk 200 having a center bore 202 and longitudinal axis 203 therethrough. Bore 202 includes a first diameter portion 702 having a diameter larger than a second and third diameter portions 704 and 706. A segmented ring 708 may be fabricated of a plurality of circumferential segments of a length 710 that is substantially equal to the distance between second and third diameter portions 704 and 706. For example, first diameter portion 702 forms a radially outward recess in a sidewall 712 of bore 202 and segmented ring 708 is sized to fit between second and third diameter portions 704 and 706. As described above, with respect to configurations 2, 3, and 6, an axial force Fa applied to an engagement surface 714 of plug tool 716 generates a radial force Fr about a circumference of first diameter portion 702 and generating a hoop stress in high pressure turbine disk 200 through segmented ring 708. A width 718 of a gap 720 regulates an amount of radial force Fr applied to high pressure turbine disk 200 by limiting the travel of plug tool 716.

Figure 8:
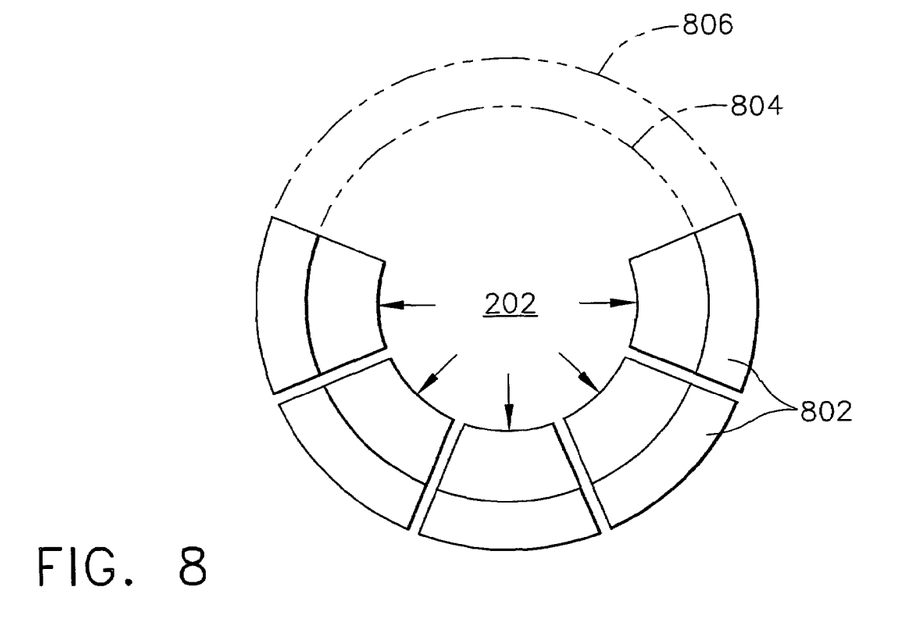
FIG. 8 is a plan view of a portion of an exemplary segmented ring installed within the disk bore.
Figure 9:
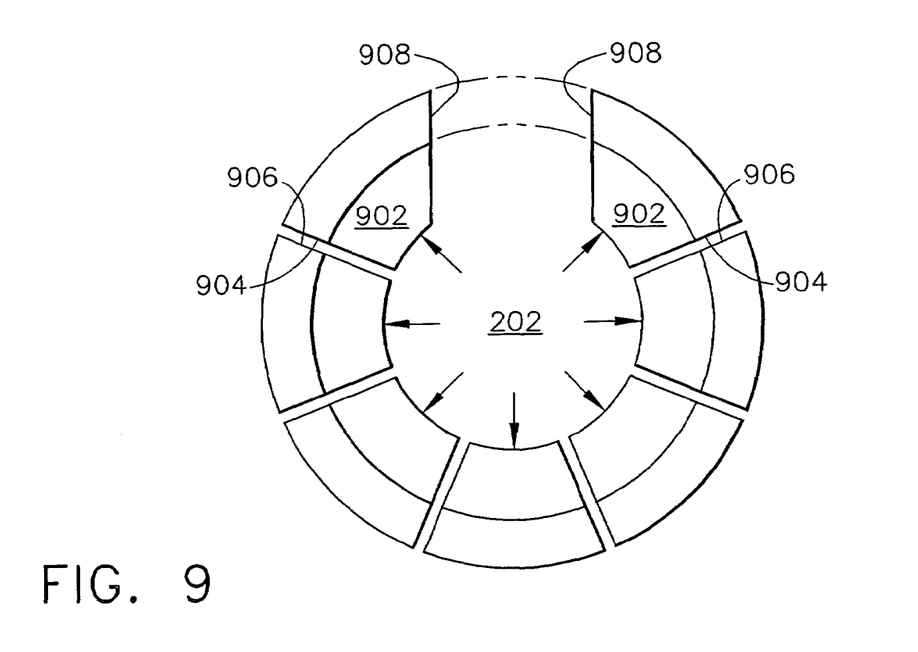
FIG. 9 is a plan view of another portion of the segmented ring installed within the disk bore.
Figure 10:
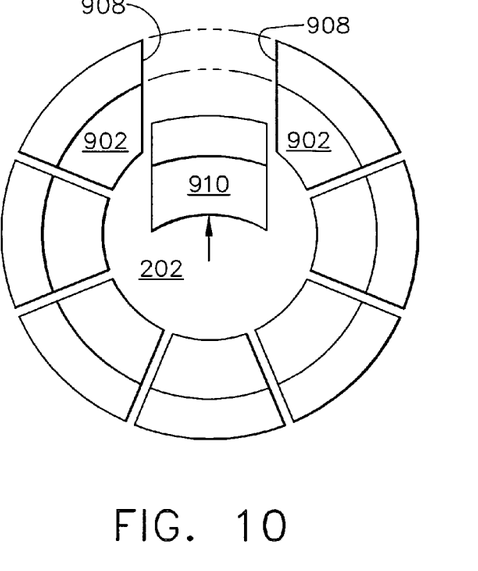
FIG. 10 is a plan view of a final portion of the segmented ring installed within the disk bore.

FIG. 8 is a plan view of a portion of exemplary segmented ring 708 installed within bore 202. FIG. 9 is a plan view of another portion of segmented ring 708 installed within bore 202. FIG. 10 is a plan view of a final portion of segmented ring 708 installed within bore 202. Segmented ring 708 includes a plurality of segments 802 that may be inserted axially into bore 202 to clear second and third diameter portions 704 and 706, and then may be slid radially outward until seated first diameter portion 702. Area 804 is defined by the diameter of second and third diameter portions 704 and 706, and area 806 is defined by the diameter of first diameter portion 702. As illustrated in FIG. 9, a second portion of segments 902 may be inserted into bore 202 and slid radially outwardly into the recess formed by first diameter portion 702. Segments 902 are configured on a first side 904 to mate with a side 906 of adjacent segments 802. A second side 908 of segments 902 are substantially parallel with respect to each other. As illustrated in FIG. 10, forming sides 908 parallel to each other permits installation of a last segment 910 into the recess formed by first diameter portion 702 between sides 908.

Figure 11:
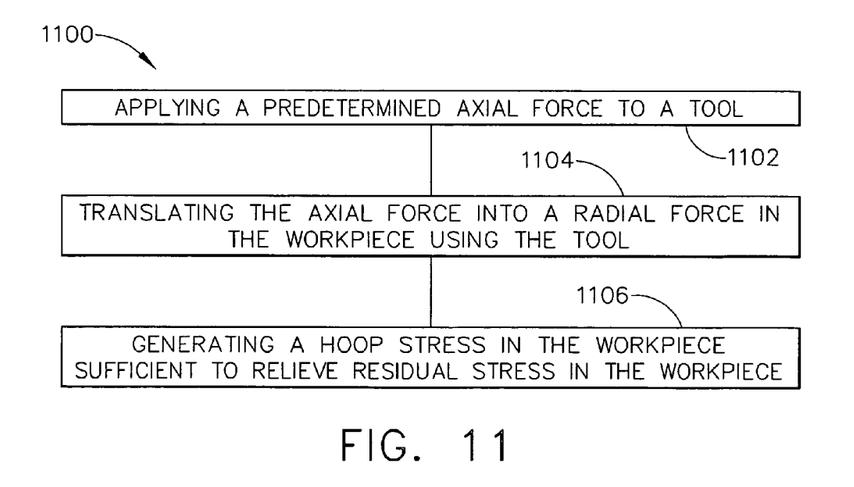
FIG. 11 is a flowchart illustrating an exemplary method of relieving residual stress in a workpiece.

FIG. 11 is a flowchart illustrating an exemplary method 1100 of relieving residual stress in a workpiece, such as high pressure turbine disk 200. Disk 200 may be formed in a powder metal alloy forging process into a blank or forging heat treat shape, such that metal, in excess of the final machined size of the disk, may be permitted in the forging. The excess stock allows for forging process variations, manufacturing handling and tolerances, and other treating processes that may be used that remove metal from the forging to accomplish the process. The cooling portion of the forging process generates residual stresses into the workpiece, which, if not removed, may cause warping and/or growth of the final machined piece during operation. Such warpage an/or growth may affect clearance tolerances and part fit-up. The residual stress may be reduced by applying 1102 a predetermined axial force to a plug tool that is mated to an inner surface of a bore through the workpiece. In the exemplary embodiment, the plug tool is of a frusto-conical profile and engages a bore in the workpiece with a convergent profile. As an axial force is applied to the plug tool, forcing it into the bore, the combination of the frusto-conical plug tool and convergent bore tends to resist the plug tool from advancing into the bore. This reaction translates 1104 the axial force into a radial force in the workpiece. The radial force acting radially outward from the bore into the workpiece generates 1106 a hoop stress that is predetermined to be of sufficient magnitude to at least partially reduce the residual stresses. The convergent profile of the bore may be formed in the forging process to provide a mating surface for the plug tool. In the exemplary embodiment, the angle of convergence is approximately fifteen degrees with respect to the longitudinal axis of the workpiece. In other embodiments, the angle of convergence may be other predetermined angles. Additionally, the workpiece bore may not be convergent but, rather may be a cylindrical or a compound cylindrical shape wherein several cylindrical profiles of different radii define the inner surface of the bore. In such cases, a ring may be used as a mating adapter between the plug tool and the bore. For example, the outer periphery of the ring may be formed to match the inner surface of the bore, and the inner surface of the ring may be formed to match the profile and dimensions of the plug tool. The ring may be solid, slotted and/or segmented to facilitate expansion. The plug tool may comprise a double frusto-conical profile such that the narrow diameter of each frusto-conically shaped plug tool is adjacent the narrow diameter of the other plug tool. Accordingly, a ring used with a double frusto-conical plug tool may be formed to mate with two frusto-conical surfaces.

The magnitude of radial force applied to the workpiece may be controlled by the distance the plug tool is permitted to travel in the bore. In the exemplary embodiment, travel is limited by a gap defined between adjacent faces of the plug tool and the work surface or a gap defined between adjacent faces of the double frusto-conical plug tool. When the gap is closed, the plug bears on an immovable surface and ceases moving. In the exemplary embodiment, the axial force is applied to the plug tool using a hydraulic ram and movement of the ram may be stopped using a control system monitoring the force applied directly, through for example a strain gauge or may monitor the gap distance and stop movement of the ram when the gap is closed.

The above-described methods and apparatus for fabricating rotatable machines is cost-effective and highly reliable means for relieving residual stress in forged components without pre-spinning the component. Each embodiment may be performed with standard tooling available in forging and machining shops, and therefore is able to be completed in the normal course of fabrication. Accordingly, the stress relief methods described herein facilitate fabrication of forged components, while reducing cost and part cycle time, in a cost-effective and reliable manner.

Exemplary embodiments of rotatable machine fabrication apparatus components are described above in detail. The components are not limited to the specific embodiments described herein, but rather, components of each apparatus may be utilized independently and separately from other components described herein. Each rotatable machine fabrication apparatus component can also be used in combination with other rotatable machine fabrication apparatus components.

While the invention has been described in terms of various specific embodiments, those skilled in the art will recognize that the invention can be practiced with modification within the spirit and scope of the claims.

What is claimed is:

1. A method of fabricating a workpiece that includes a bore therethrough, said method comprising:
   inserting a tool into the bore in a first axial direction;
   applying a predetermined axial force to a tool;

applying a predetermined axial force to the tool to cause the tool to be partially inserted into the bore defined in the workpiece in the first axial direction;

determining a desired axial gap distance that is adjacent to a travel stop face of the tool, wherein the travel stop face limits travel of the tool, and wherein the desired axial gap distance corresponds to the predetermined axial force; and providing the axial gap that is adjacent to the travel stop face that is approximately equal to the desired axial gap distance;

translating, during insertion of the tool into the bore, the axial force into a radial force in the workpiece using the tool until the axial gap is substantially closed; and generating a hoop stress in the workpiece using the radial force, wherein the hoop stress is sufficient to at least partially reduce residual stresses in the workpiece.

2. A method in accordance with claim 1 further comprising:

positioning a ring radially outward from the tool to mate with the workpiece wherein the ring includes at least one of longitudinally-oriented slots and longitudinally-oriented segments; and translating the axial force into a radial force through the ring to the workpiece.

3. A method in accordance with claim 1 wherein at least a portion of the bore is radially convergent, and wherein translating, during insertion of the tool into the bore, the axial force into a radial force in the workpiece comprises pressing a frusto-conical portion of the tool into the bore.

4. A method in accordance with claim 1 comprising:

positioning a ring radially outward from the tool such that a radially outer surface of the ring is configured to mate with the workpiece;

inserting a double frusto-conical cross-sectional portion of the tool within the substantially cylindrical bore; and translating the axial force into a radial force through the ring to the workpiece.

5. A method in accordance with claim 4 wherein said positioning a ring radially outward from the tool comprises positioning a ring including at least one of longitudinal slots and longitudinal segments radially outward from the tool.

6. A method in accordance with claim 1 wherein the workpiece includes a plurality of substantially cylindrical axially-spaced surfaces, said method further comprising:

positioning a ring radially outward from the tool such that a radially outer surface of the ring is configured to mate with the workpiece inserting a double frusto-conical cross-sectional portion of the tool within the bore; and translating the axial force into a radial force through the ring to the workpiece.

7. A method in accordance with claim 6 wherein positioning a ring radially outward from the tool comprises positioning a ring including at least one of longitudinal slots and longitudinal segments radially outward from the tool.

8. A method in accordance with claim 6 wherein a surface defining the bore includes a recessed circumferential portion, and wherein positioning a ring radially outward from the tool comprises:

providing a segmented ring having a plurality of longitudinal segments;

inserting each longitudinal segment into the bore; and translating each segment radially outward such that an outer peripheral surface of each segment mates with a corresponding radially inner surface of the recessed circumferential portion.

9. A method in accordance with claim 1 further comprising fabricating the workpiece using a metal alloy forging process.

10. A method in accordance with claim 1 further comprising fabricating the workpiece to a forging heat treat shape that includes the predetermined portion of excess stock remaining on the workpiece when relieving residual stress in the workpiece.

11. A method in accordance with claim 1 wherein applying a predetermined axial force to a tool comprises applying a predetermined axial force to the tool using a hydraulic ram.

12. A method in accordance with claim 1 wherein said translating, during insertion of the tool into the bore, the axial force into a radial force in the workpiece using the tool until the axial gap is substantially closed comprises axially pressing the tool from a first axial gap distance to a second axial gap distance wherein the first axial gap distance is larger than the second axial gap distance.

* * * * *